United States Patent [19]

Ishizaki et al.

[11] Patent Number: 4,643,557

[45] Date of Patent: Feb. 17, 1987

[54] EXPOSURE CONTROL APPARATUS

[75] Inventors: Akira Ishizaki; Akira Akashi, both of Yokohama; Keiji Ohtaka, Tokyo; Yasuo Suda; Akira Hiramatsu, both of Yokohama, all of Japan

[73] Assignee: Canon Kabushiki Kaisha, Tokyo, Japan

[21] Appl. No.: 778,718

[22] Filed: Sep. 23, 1985

[30] Foreign Application Priority Data

Oct. 16, 1984 [JP] Japan .................................. 59-217149

[51] Int. Cl.4 ............................ G03B 3/00; G03B 7/08
[52] U.S. Cl. ..................................... 354/406; 354/432
[58] Field of Search ................................ 354/402–409, 354/429–432; 358/213, 225, 227, 228, 209

[56] References Cited

U.S. PATENT DOCUMENTS

| 4,324,464 | 4/1982 | Wick | 354/407 X |
| 4,366,501 | 12/1982 | Tsunekawa et al. | 354/432 X |
| 4,433,908 | 2/1984 | Omi et al. | 354/432 X |
| 4,466,718 | 8/1984 | Lermann et al. | 354/408 |
| 4,476,383 | 10/1984 | Fukuhara et al. | 354/432 X |
| 4,561,753 | 12/1985 | Plummer et al. | 354/432 |

Primary Examiner—William B. Perkey
Attorney, Agent, or Firm—Fitzpatrick, Cella, Harper & Scinto

[57] ABSTRACT

This is disclosed an exposure control device capable of controlling an exposure by using a CCD etc. sensor in which CCD sensor is also used for detecting a focus state of an imaging lens of camera or the like.

5 Claims, 5 Drawing Figures

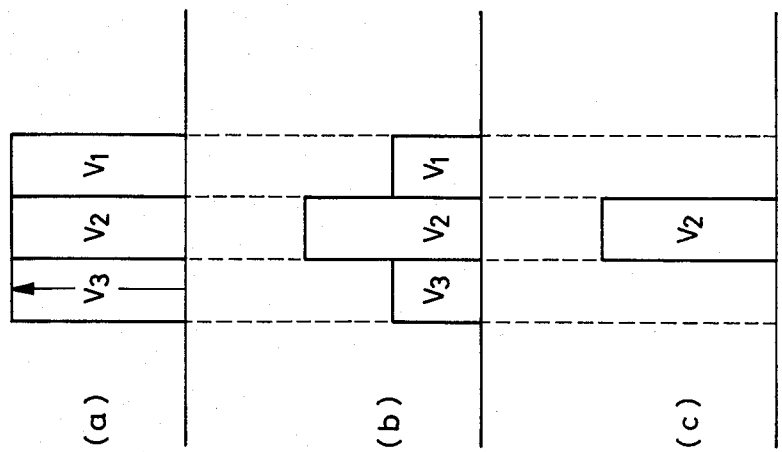
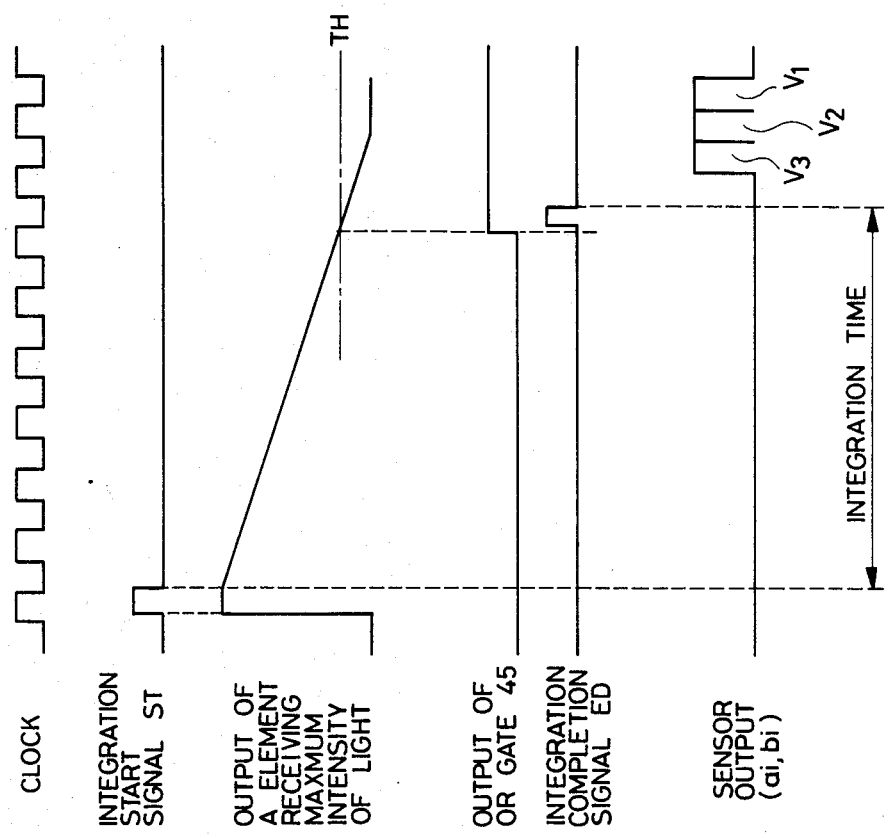

4,643,557

EXPOSURE CONTROL APPARATUS

BACKGROUND OF THE INVENTION

1. Field of the Invention

The present invention relates to an exposure control apparatus, and more particularly to an exposure control apparatus which controls exposure by an output of a sensor which detects a focus state of an imaging lens.

2. Description of the Prior Art

A prior art apparatus having a focus detection apparatus uses an exposure control sensor and a focus detection sensor independently, because desired output forms of the sensors are different. The output of the exposure control sensor must change with a change of brilliance of an object. On the other hand, in the focus detection sensor, outputs of elements of the sensor are compared or differentiated. Accordingly, variation of the output levels of the elements causes a detection error. Thus, the outputs must be constant even if the brilliance of the object changes. When storage type photosensing elements are used in the focus detection sensor, a storage time of a signal from a photoelectric converter is changed with a change of the brilliance of the object so that a constant output is always produced.

The focus detection sensor comprises a number of picture cells. Since each picture cell is much smaller than the exposure control sensor, the output from each picture cell cannot be used as a measurement for the exposure control.

Accordingly, in the prior art camera, the exposure control sensor and the focus detection sensor must be separately provided. This causes a structure to be complex and increases its size.

SUMMARY OF THE INVENTION

It is an object of the present invention to provide an exposure control apparatus which can control exposure by an output of a focus detection sensor.

It is another object of the present invention to provide an exposure control apparatus comprising:

a signal storage type sensor having a plurality of pixels;

first means for producing a signal representing a maximum one of pixel information detected by said sensor;

second means for producing a signal representing a sum of the pixel information detected by said sensor;

third means for producing a signal representing a storage time of said sensor; and calculation means for multiplying the output of said second means with the output of said third means and dividing the product by the output of said first means, whereby the exposure is controlled based on the quotient.

It is other object of the present invention to provide a method for controlling exposure in accordance with a signal storage type sensor having a plurality of pixels, comprising:

a first step for producing a signal representing a maximum one of pixel information sensed by the sensor;

a second step for producing a signal representing a sum of the pixel information sensed by the sensor;

a third step for producing a signal representing a storage time of the sensor; and a fourth step for multiplying the output of said second means with the output of said third means and dividing the product by the output of said first means, whereby the exposure is controlled in accordance with a quotient obtained in the fourth step.

BRIEF DESCRIPTION OF THE DRAWINGS

FIG. 4 shows a timing chart of the present embodiment, and FIG. 5 shows a sensor output.

DESCRIPTION OF THE PREFERRED EMBODIMENTS

Figure 1:
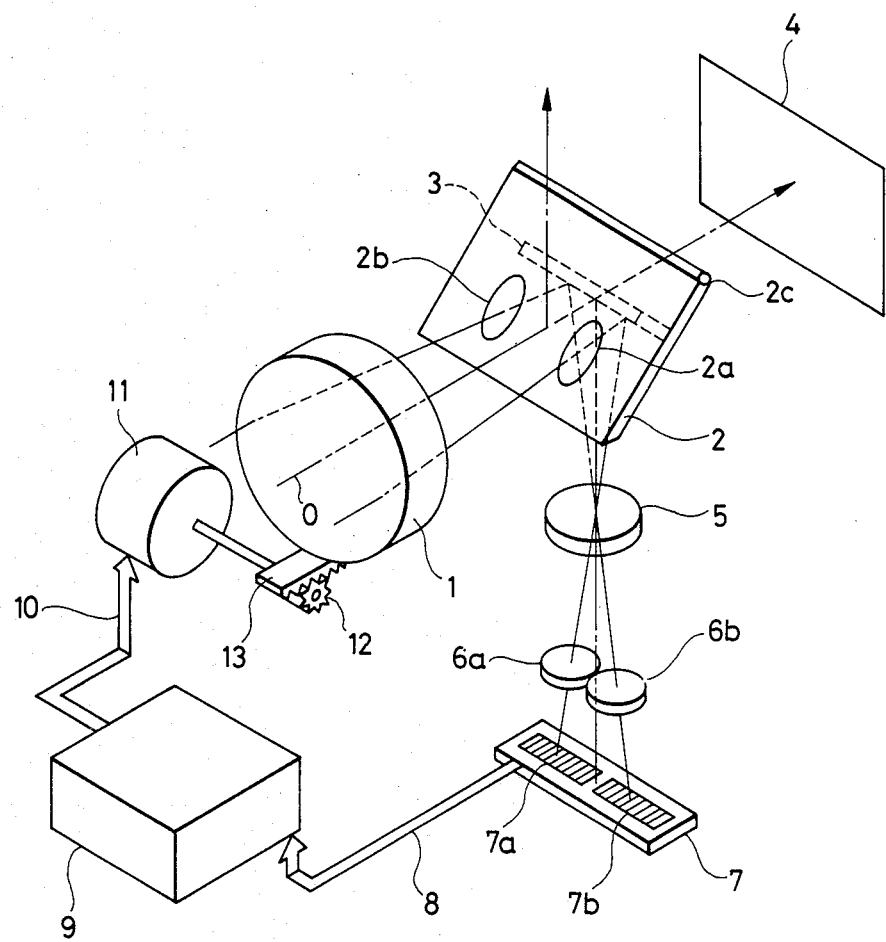
FIG. 1 is a perspective view of a single-lens reflex type camera to which the present invention is applied.

FIG. 1 shows a single-lens reflex type camera to which the present invention is applied. Numeral 1 denotes an imaging lens, and numeral 2 denotes a quick return mirror which, during a photo-taking operation, is turned upward around a support shaft 2c to direct a light flux from the imaging lens 1 to a film plane 4, and in a non-photo-taking mode, directs the light flux from the imaging lens 1 to a finder optical system (not shown) to allow observation of an object image. The mirror 2 has semi-transmissive areas 2a and 2b, and a mirror 3 which reflects light fluxes from the semi-transmissive areas 2a and 2b downward is rotatably supported by the mirror 2. The mirror 3 is linked to the mirror 2 such that when the mirror 2 rotates upward, the mirror 3 contacts the mirror 2 to screen the semi-transmissive areas 2a and 2b.

Numeral 5 denotes a field lens arranged at a conjugate position to the film plane 4, numerals 6a and 6b denote focusing lenses for forming secondary images having a parallax based on light fluxes transmitted through different areas of a pupil of the imaging lens 1, and numeral 7 denotes a sensor unit having sensors 7a and 7b each having the same number of pixels. Images on pupils of the focusing lenses 6a and 6b are focused by the field lens 5 to a vicinity of the pupil of the imaging lens 1. The focusing lenses 6a and 6b are arranged symmetrically with respect to an optical axis O of the imaging lens 1. The sensor unit 7 is a photo-electric converter of a time-serial output type such as CCD, and the sensors 7a and 7b detect the images formed by the focusing lenses 6a and 6b, respectively.

Numeral 8 denotes a signal line for supplying the photo-electrically converted signals from the pixels of the sensors 7a and 7b to a circuit unit 9. The photo-electrically converted signals from the pixels are time-serially transmitted to the circuit unit 9 through the signal line 8. The circuit unit 9 detects a displacement of the two images detected by the sensors 7a and 7b based on the input photo-electrically converted signals to determine a defocus amount of the imaging lens 1. Numeral 11 denotes a motor which is controlled by the circuit unit 9, numeral 12 denotes a pinion gear fixed to an output shaft of the motor 11, and numeral 13 denotes a rack gear for moving the imaging lens 1 along the optical axis O as the pinion gear 12 rotates. The focus of the imaging lens 1 is adjusted by those elements. The motor 11 is driven by a signal which is transmitted from the circuit unit 9 through a signal line 10 and which represents the defocus amount.

Figure 2:
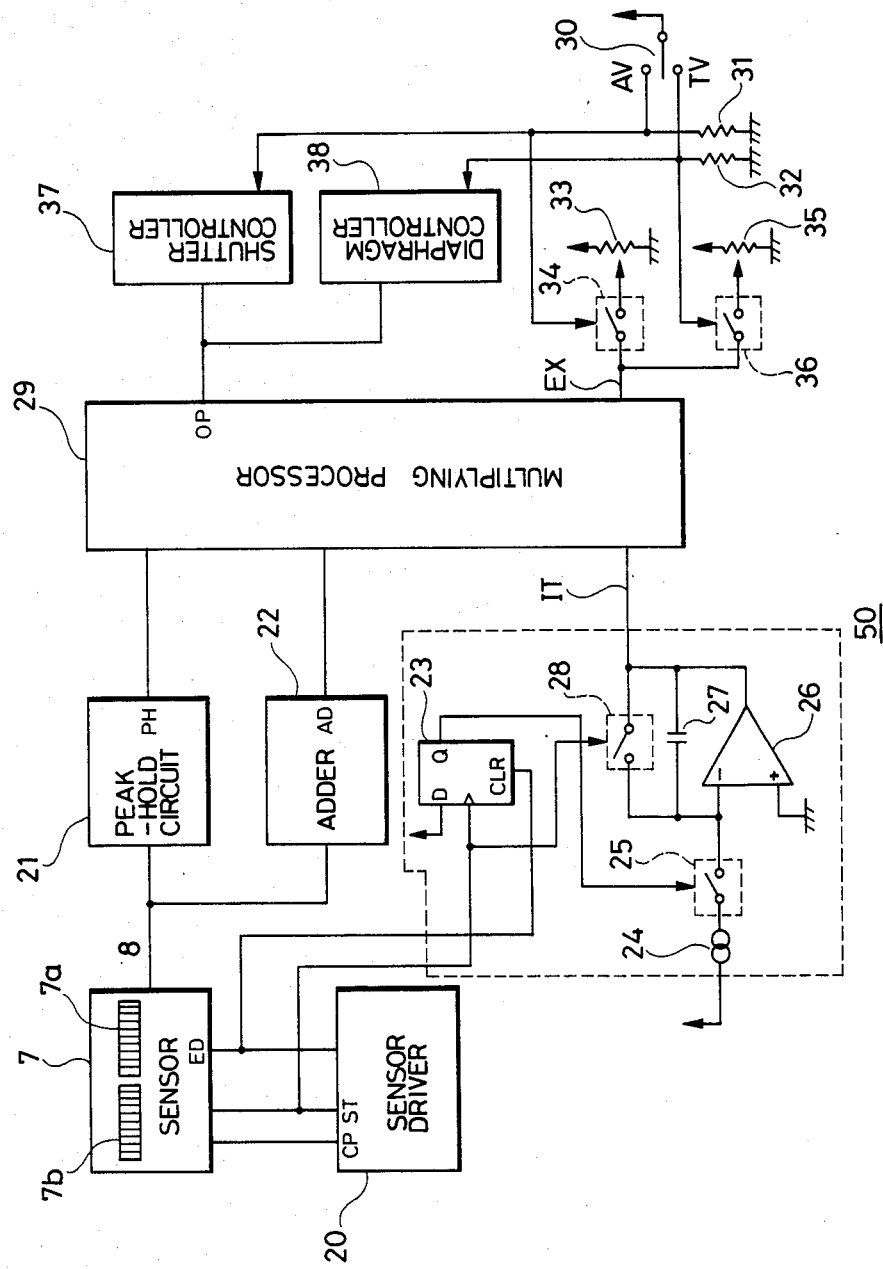
FIG. 2 shows a circuit diagram of one embodiment of an exposure control apparatus of a camera in accordance with the present invention.

FIG. 2 shows one embodiment of the present invention. Numeral 20 denotes a sensor drive circuit for controlling storage and transfer of the photo-electrically converted signals of the sensors 7a and 7b. The photo-electrically converted signals of the pixels of the sensors 7a and 7b are stored in the sensor unit 7 by a start signal ST, and the stored signals of the pixels from the unit 7 are time-serially outputted in synchronism with a clock CP in response to an end of storage signal ED from the sensor unit 7. The outputs for the pixels from the sensors 7a and 7b are designated by a1, a2, ... an-1, an and b1, b2, ... bn-1, bn from right to left, where n is the number of pixels.

Numeral 21 denotes a peak hold circuit for holding a maximum one of the outputs ai and bi (i=1~n) from the unit 7, numeral 22 denotes an adder which calculates a total sum of the outputs ai and bi ($\Sigma ai + \Sigma bi$), numeral 50 denotes a circuit for measuring a storage time of the sensor, numeral 23 denotes a D-type flip-flop (D-FF), numeral 24 denotes a constant current source, numeral 25 denotes an analog switch which is turned on by a Q-output of the D-FF 23, numeral 26 denotes an operational amplifier having a non-inverting input grounded and an inverting input connected to the switch 25, numeral 27 denotes a capacitor connected to a feedback path of the operational amplifier 26, and numeral 28 denotes an analog switch for resetting the capacitor 27. It is turned on by the signal ST from the sensor drive circuit 20. The constant current source 24, switches 25 and 28, operational amplifier 26 and capacitor 27 form a circuit for measuring the storage time of the sensor unit 7. This circuit produces a signal (voltage) IT which represents the storage type.

Numeral 29 denotes a multiplier, numeral 30 denotes a manual switch for setting an exposure mode of the camera, and numerals 31 and 32 denote pull-up resistors. When the switch 30 is set to a diaphragm, or aperture priority position AV, the analog switch 34 is turned on, and when the switch 30 is set to a shutter, or time priority position TV, the analog switch 36 is turned on. Numeral 33 denotes a potentiometer for generating a voltage expanded in accordance with a stop value set on the camera, numeral 35 denotes a potentiometer for generating a voltage expanded in accordance with a shutter time set on the camera, numeral 37 denotes a shutter controller for controlling a shutter (not shown) based on an output OP of the multiplier 29, and numeral 38 denotes a diaphragm controller which controls a diaphragm (not shown) based on the output OP of the multiplier 29.

Figure 3:
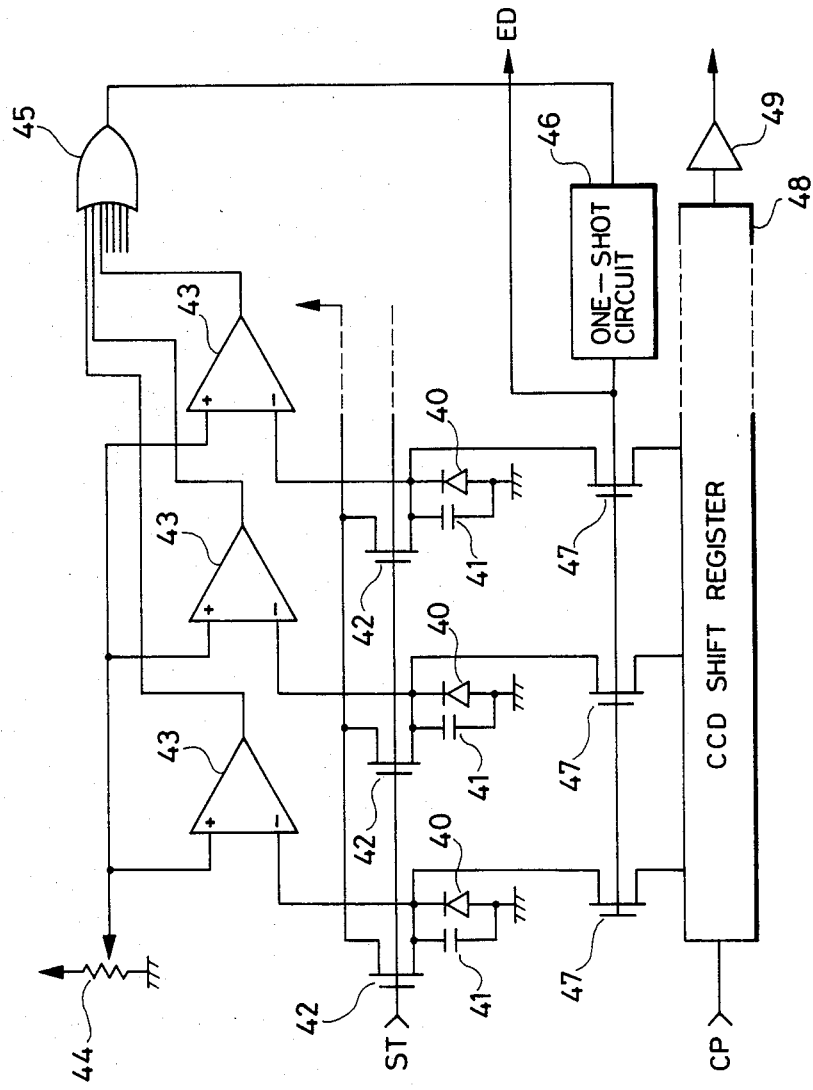
FIG. 3 shows a circuit diagram of a sensor used in the present invention.

FIG. 3 shows a detail of the sensor unit 7. Numeral 40 denotes a photo-electric conversion element which is a pixel of the sensors 7a and 7b, numeral 41 denotes a capacitor into which a charge stored by discharge of a current created in the photo-electric conversion element 40, numeral 42 denotes a gate which is turned on by the pulse signal ST to charge the capacitor 41, numeral 43 denotes a comparator which compares the potential of the capacitor 41 with a threshold (voltage) TH set by a potentiometer 44 and produces a high level output when the potential of the capacitor 41 is lower than the threshold, numeral 45 denotes an OR gate to which the outputs of the comparators 43 are connected, and numeral 46 denotes a one-shot circuit which produces the pulse signal ED when the OR gate 45 produces a high level output. A transfer gate 47 responds to the output signal from the one-shot circuit 46 to transfer a discharge amount of the capacitor 41 to a CCD shift register 48. The shift register 48 transfers the information transferred from the capacitor 41, to an amplifier 49 in synchronism with the clock CP. Accordingly, the amplifier 49 time-serially outputs the pixel information ai and bi in the sequence of a1, a2, ... an-1, an, b1, b2, ... bn-1, bn. While only three photoelectric conversion elements 40 are shown in FIG. 3, each of the sensors 7a and 7b actually has n elements. As many capacitors 41, gates 42 and 47 and comparators 43 as the number of photo-electric conversion elements 40 are provided.

FIG. 5 shows an output of the sensor of FIG. 3 when n=3. FIG. 5(a) shows an output when a light is uniformly applied to the elements 40, FIG. 5(b) shows an output when a light intensity to the opposite end elements 40 is one-half of that to the center element 40, and FIG. 5(c) shows an output when no light is applied to the opposite end elements 40. According to the feature of the present sensor, the peak of the outputs V1, V2 and V3 is constant even if the brilliance pattern of the image changes as shown in FIGS. 5(a)–5(c).

A principle of brilliance detection in the present invention is explained. The sensor shown in FIG. 3 having N photo-electric conversion elements is considered. Light intensity (light energy) applied to each of the N photo-electric conversion elements is given by In (n=1~N), a maximum light intensity of light intensities Ik (k=1 ... N) is given by $I_{p1}$, outputs of the photo-electric conversion elements to which the light intensity Ik is applied are given by Vn(n=1~N), an output of the photo-electric conversion element to which the maximum light intensity Ip is applied is given by Vp. An integration time of the sensor is given by Tint, a photoelectric conversion coefficient of the photo-electric conversion element is given by A, and a proportional constant is given by $\eta$. Thus, $$Vn = A(In \times Tint) \quad (1)$$

$$Vp = A(Ip \times Tint) \quad (2)$$

Since the integration time Tint of the sensor varies with the maximum light intensity Ip, $$Tint = \eta \times Ip \quad (3)$$

A total light intensity $$\sum_{n=1}^{N}$$

In for the N elements is given, from the formula (1), by $$\Sigma Vn = A \cdot Tint \cdot \Sigma In \quad (4)$$

Thus, $$\Sigma In = \Sigma Vn / A \cdot Tint \quad (5)$$

From the formula (2), $$A = Vp/Ip \cdot Tint \quad (6)$$

Accordingly, the formula (5) is represented by $$\Sigma In = \Sigma Vn \cdot Ip/Vp \quad (7)$$

By deleting Ip by the formula (3), the formula (7) is represented by $$\Sigma In = (\Sigma Vn . Tint)/(Tp.\eta)$$

Since η in the formula (8) can be measured, the right side of the formula (8) is known. From the formula (8), it is possible to determine the total incident light intensity in the sensor of FIG. 3 having N photoelectric conversion elements. Once the incident light intensity ΣIn is determined, it is divided by the stop value information or the shutter time information to obtain a shutter time or a stop value necessary to accurately control the exposure of the camera.

The operation of the present embodiment is explained with reference to a timing chart shown in FIG. 4. In the present embodiment, the incident light intensity is determined in accordance with the formula (8). When the sensor drive circuit 20 of FIG. 2 produces the signal ST, the sensor unit 7 starts the integration of the pixel signals and the switch 28 is turned on during the period of the signal ST to reset the capacitor 27. Since the D-FF 28 is set by the signal ST, the switch 25 is turned on by the Q-output of the D-FF 28, and the capacitor 27 is once reset and stores the current from the constant current source 24. When the potential of the capacitor 41 corresponding to the photo-electric conversion element 40 which receives the maximum light intensity becomes below the threshold TH of the comparator 43, the OR gate 45 produces the high level output and the one-shot circuit 46 produces the signal ED. At the same time, the outputs ai and bi of the capacitors 41 are transferred to the shift register 48 through the gate 47. In response to the signal ED, the sensor drive circuit 20 stops the integration of the sensor unit 7 and time-serially outputs ai and bi from the sensor unit 7 in synchronism with the clock CP. Since the D-FF 23 is cleared by the signal ED, the switch 25 is turned off. Accordingly, the capacitor 27 ceases to store. The potential $V_{IT}$ stored in the capacitor 27 is proportional to the integration time Tint of the sensor unit 7.

The peak hold circuit 21 detects the maximum one of the outputs ai and bi and produces a voltage $V_{PH}$ which is proportional to the maximum output. The adder calculates the total sum of the outputs ai and bi and produces a voltage $V_{AD}$ which is proportional to the total sum. If the switch 30 is set to the position AV, the switch 34 is on and a voltage $V_{AV}$ which represents the stop value appears on the signal line EX.

The multiplier/divider 29 calculates the incident light intensity in accordance with the formula (8) and divides it by $V_{AV}$ to produce information necessary to control the shutter at the terminal OP. The multiplier/divider 29 calculates $V_{OP}$ by $$V_{OP} = K \cdot (V_{AD} \cdot V_{IT} / V_{PH} \cdot V_{AV}) \tag{9}$$

where K is a proportional constant. The shutter controller 37 controls the shutter based on $V_{OP}$ to properly control the exposure of the diaphragm priority camera. When the switch 30 is set to the position TV, the diaphragm controller 38 controls the diaphragm based on $V_{OP}$.

The outputs ai and bi of the sensor unit 7 are supplied to the circuit unit 9 through the signal line 8 and the circuit unit 9 determines the defocus amount of the imaging lens 1 in a manner described in Japanese Unexamined Patent Application Laid Open No. 45510/1982.

The multiplier/divider 29 may be replaced by an A/D converter and a microprocessor. All signal processings may be done by the microprocessor.

In accordance with the present invention, since the exposure of the camera is controlled by the output of the focus detection storage type sensor, the space in the camera can be effectively utilized.

While all of the sensor element outputs are used to control the exposure in the above embodiment, the outputs of a portion of the elements, for example, peripheral elements of the sensor may be omitted in producing the sum.

We claim:
1. An exposure control apparatus comprising:
   a signal storage type sensor having a plurality of pixels;
   first means for producing a signal representing a maximum one of pixel information detected by said sensor;
   second means for producing a signal representing a sum of the pixel information detected by said sensor;
   third means for producing a signal representing a storage time of said sensor; and
   calculation means for multiplying the output of said second means with the output of said third means and dividing the product by the output of said first means,
   whereby the exposure is controlled based on the quotient.
2. An exposure control apparatus according to claim 1 wherein said first, second and third means are portions of a microcomputer.
3. An exposure control apparatus according to claim 1 wherein said sensor receives images of an object having a parallax.
4. A camera having a focus detection device for an object lens, comprising:
   optical means for forming a plurality of secondary images from an image of the object formed by the object lens;
   a signal storage type sensor having a plurality of pixels for sensing the secondary images,
   exposure control means for controlling exposure of the camera; and
   means for determining a control value to said exposure control means in accordance with a sum of information of said plurality of pixels and a storage time of said sensor.
5. A method for controlling exposure in accordance with a signal storage type sensor having a plurality of pixels, comprising:
   a first step for producing a signal representing a maximum one of pixel information sensed by the sensor;
   a second step for producing a signal representing a sum of the pixel information sensed by the sensor;
   a third step for producing a signal representing a storage time of the sensor; and
   a fourth step for multiplying the output of said second means with the output of said third means and dividing the product by the output of said first means, whereby the exposure is controlled in accordance with a quotient obtained in the fourth step.

* * * * *